United States Patent [19]
Gangstead et al.

[11] Patent Number: 5,508,837
[45] Date of Patent: Apr. 16, 1996

[54] OPTICAL SCANNING SYSTEM

[75] Inventors: Mervin L. Gangstead, Richardson; John D. Boardman, Garland, both of Tex.

[73] Assignee: E-Systems, Inc., Dallas, Tex.

[21] Appl. No.: 438,367

[22] Filed: May 10, 1995

Related U.S. Application Data

[63] Continuation of Ser. No. 224,579, Apr. 7, 1994, abandoned.

[51] Int. Cl.⁶ .................................................. G02B 26/08
[52] U.S. Cl. .................. 359/201; 359/212; 359/220; 358/493; 347/259; 250/236
[58] Field of Search ................................. 346/108, 160; 359/197, 214, 220, 212, 201, 221, 226, 202; 358/489, 490, 493, 496–498, 296, 474; 347/356, 260, 262, 137, 139; 250/234–236, 589

[56] References Cited

U.S. PATENT DOCUMENTS

| | | | |
|---|---|---|---|
| 1,792,264 | 2/1931 | Alexanderson | 358/491 |
| 1,857,130 | 5/1932 | Alexanderson | 358/493 |
| 3,600,507 | 8/1971 | Newgard et al. | 358/412 |
| 3,651,256 | 3/1972 | Sherman et al. | 358/489 |
| 3,737,575 | 6/1973 | Kominami | 358/491 |
| 3,781,902 | 12/1973 | Shim et al. | 346/24 |
| 3,925,607 | 12/1975 | Hauber | 358/491 |
| 3,938,191 | 2/1976 | Jarmy | 360/102 |
| 4,067,021 | 1/1978 | Baylis et al. | 346/108 |
| 4,168,506 | 9/1976 | Corsover | 346/108 |
| 4,479,147 | 10/1984 | Rossini | 358/498 |
| 4,595,957 | 6/1986 | Holthusen | 358/480 |
| 5,025,157 | 6/1991 | Katsuaki | 250/589 |
| 5,032,848 | 7/1991 | Morita | 346/108 |

*Primary Examiner*—James Phan
*Attorney, Agent, or Firm*—Harold E. Meier

[57] ABSTRACT

An optical scanning system wherein a moving cylinder supporting a segment of recording media on its inner surface is axially moved over a pair of fixed cylinders. A slit is provided between the fixed cylinders, and a light beam is radially scanned by the system through and along the slit to scan the surface of the supported segment of media as the moving cylinder moves in an axial direction over the fixed cylinders and across the slit. A pressure source provides air to the moving cylinder, with the supplied air expelled from an inner surface of the moving cylinder against the fixed cylinders to form an air bearing. Air is also expelled into the area between the fixed and moving cylinders to float the media therein during media advancement. A vacuum source is also provided to draw air through the moving cylinder from the area between the fixed and moving cylinders holding the media against the inner surface of the moving cylinder while the media is being scanned by the light beam.

12 Claims, 4 Drawing Sheets

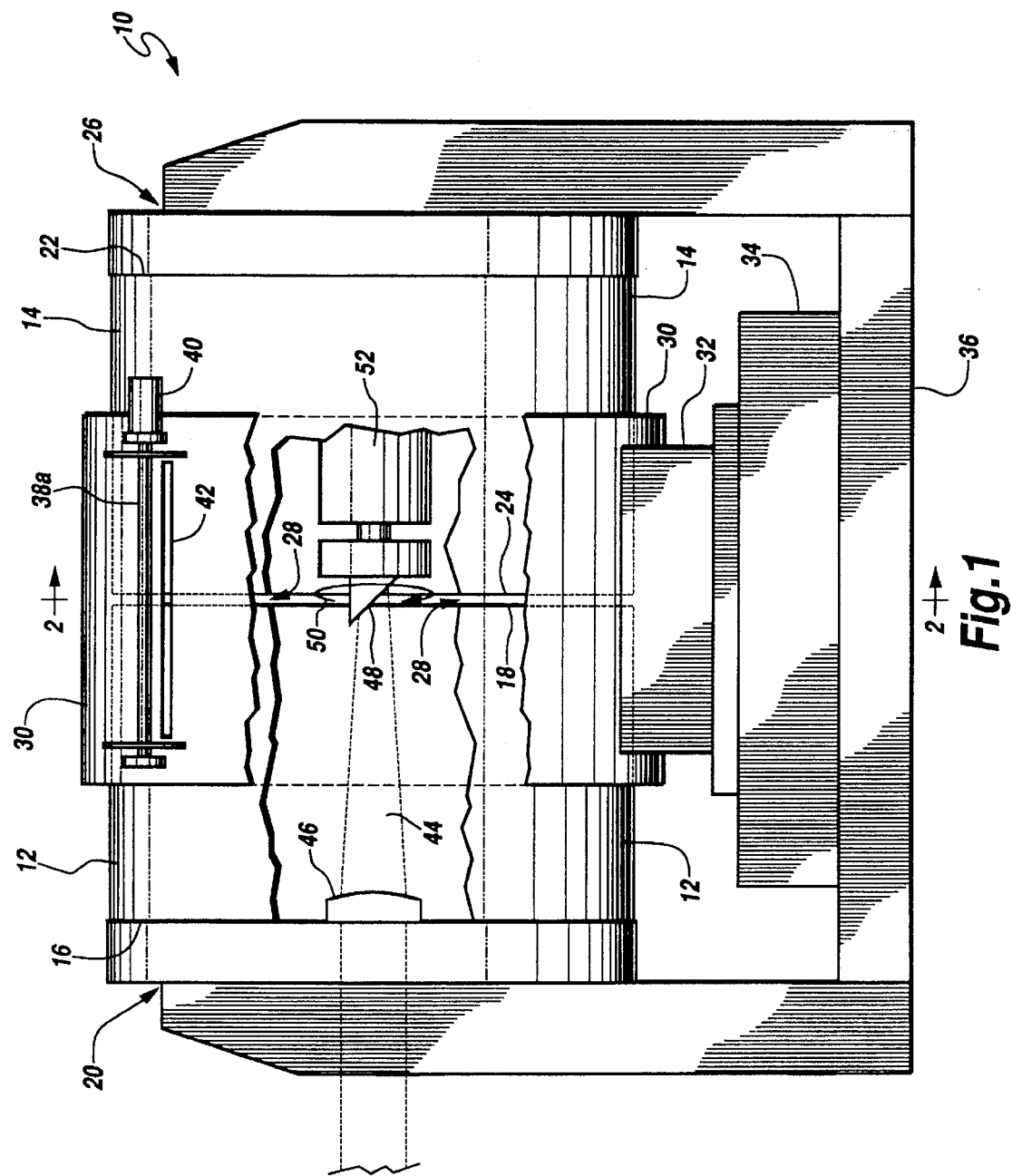

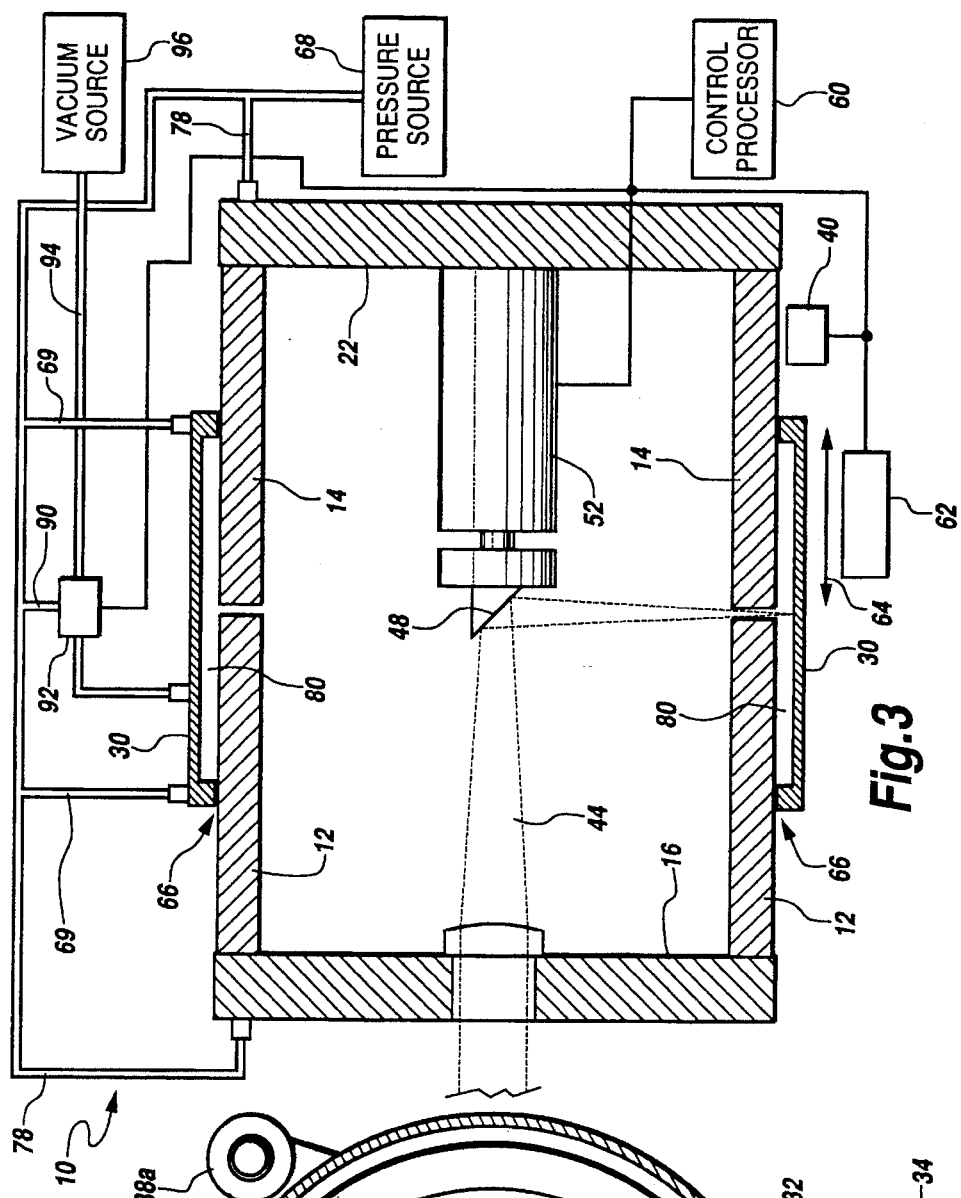
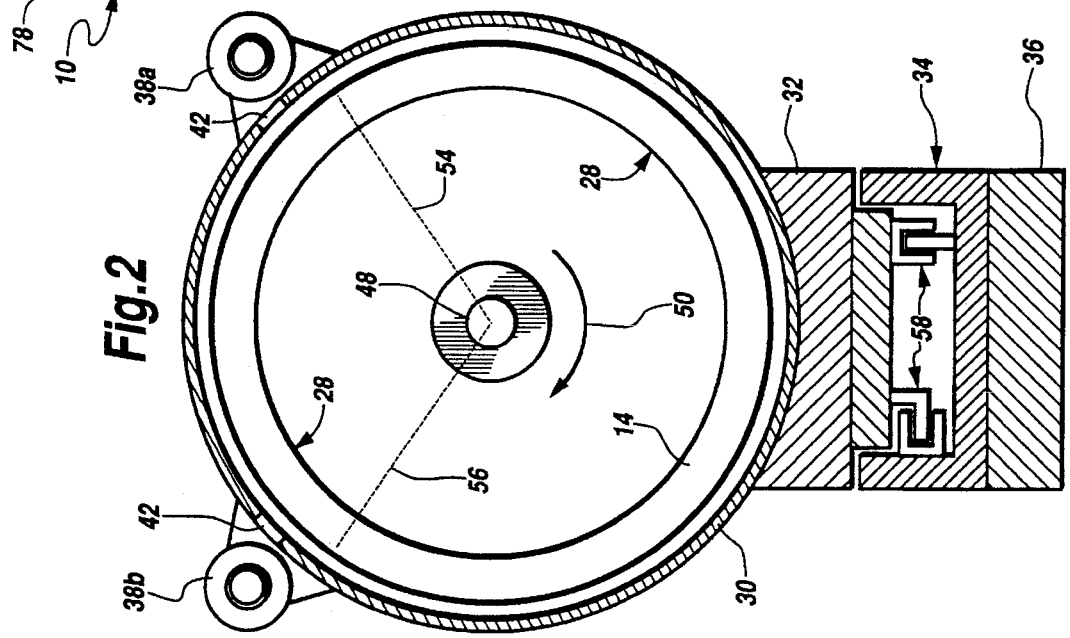

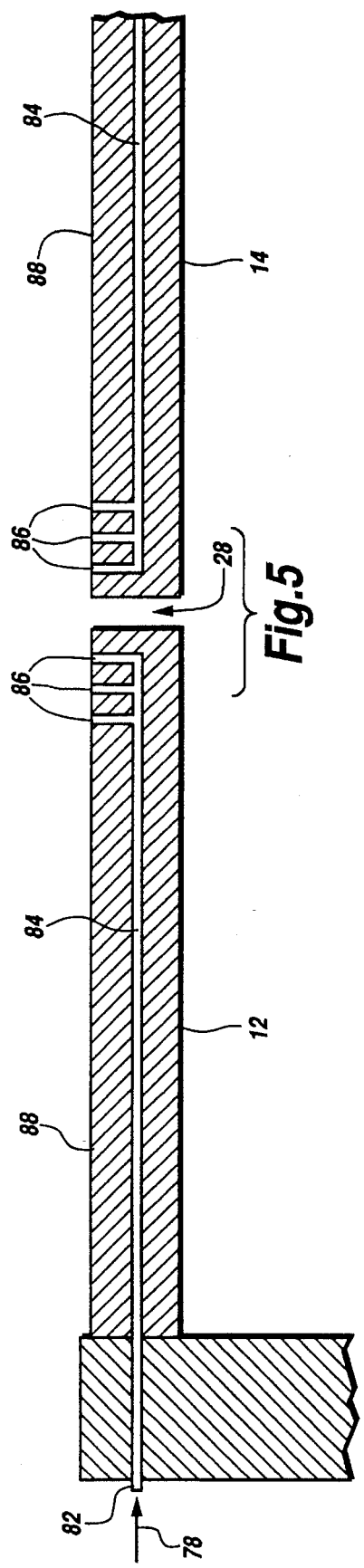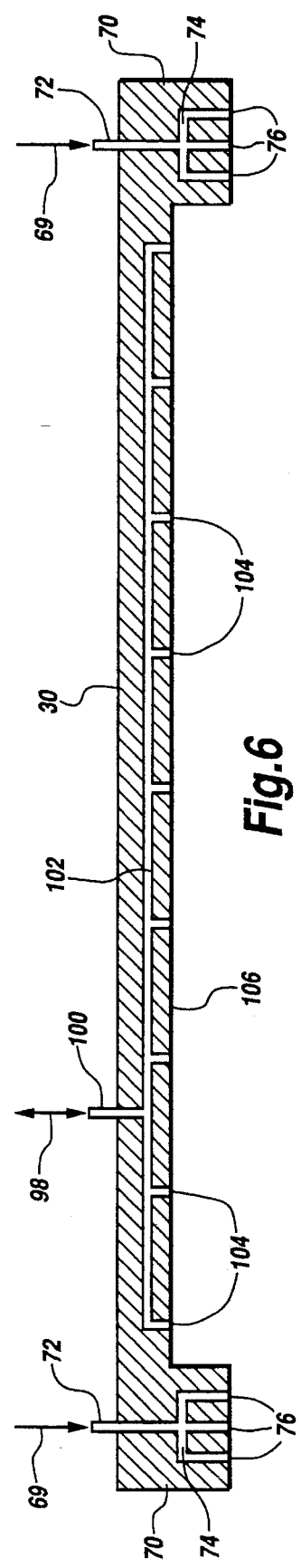

5,508,837

OPTICAL SCANNING SYSTEM

This is a continuation of application Ser. No. 08/224,579, filed Apr. 7, 1994 now abandoned.

TECHNICAL FIELD

The present invention relates to optical scanning systems.

BACKGROUND OF THE INVENTION

It is well known in optical scanning systems that a rotating scanning element, such as an angled reflecting mirror, will project and scan a collimated light beam along a line across the surface of an article. To scan the entire article, the rotating scanning element is moved relative to the article in a direction parallel to the axis of scanning element rotation, thus tracing a plurality of scan lines across the article. Such axial movement of the scanning element often induces scanning element vibration, adversely affecting the quality of the scan. One solution to this problem is to precisely control scanning element movement. The mechanism required for providing precise, vibration-free control over scanning element movement, however, is both complicated and expensive. Accordingly, the use of axially moving scanning elements is not preferred for high quality (high resolution) scanning systems. Preferably, scanning of the entire article is accomplished by fixing the position of the rotating scanning element and moving the article in a direction parallel to the axis of scanning element rotation.

SUMMARY OF THE INVENTION

A moving cylinder is provided including means for retaining to its inner surface a segment of recording media to be scanned. The moving cylinder is coaxially disposed over a fixed cylinder means that includes a circumferential slit. A light beam is radially projected through the slit to scan across the retained segment of recording media as the moving cylinder longitudinally moves relative to the fixed cylinder means and across the slit. Following completion of scanning, the segment is released to allow a next segment of recording media to be advanced into position and retained for scanning.

BRIEF DESCRIPTION OF THE DRAWINGS

A more complete understanding of the optical scanning system of the present invention may be had by reference to the following Detailed Description when taken in conjunction with the accompanying Drawings wherein:

FIG. 1 is a side view of the optical scanning system of the present invention partially broken away to reveal interior system components;

FIG. 2 is a lateral cross-sectional view of the optical scanning system of the present invention taken along lines 2—2 of FIG. 1;

FIG. 3 is a schematic diagram illustrating the operational controls for the optical scanning system of the present invention;

FIG. 5 is a partial longitudinal cross-sectional view of the fixed cylinder; and FIG. 6 is a longitudinal cross-sectional view of the moving cylinder.

DETAILED DESCRIPTION OF THE DRAWINGS

Figure 4A:
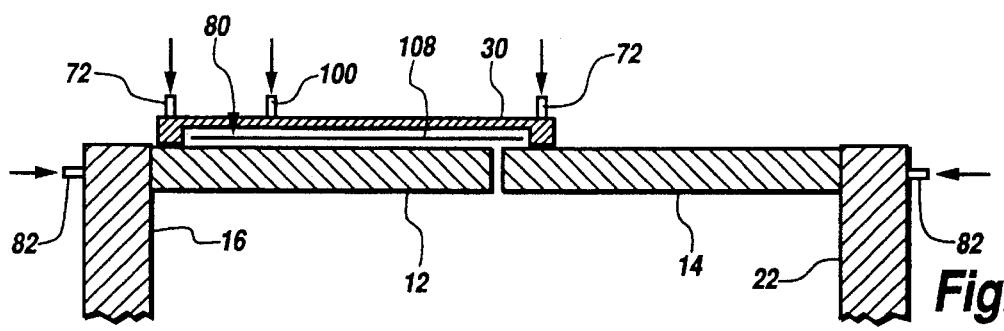
FIGS. 4A–4E are longitudinal cross-sectional views of the fixed and moving cylinders illustrating operation of the optical scanning system of the present invention.

Referring now to FIG. 1, there is shown a partially broken away side view of the optical scanning system 10 of the present invention. The system 10 includes a pair of fixed position, axially aligned cylinders 12 and 14 (hereinafter the "fixed cylinders"). The first fixed cylinder 12 includes a first end 16 and a second end 18, and is mounted at its first end 16 to a support bracket 20. The second fixed cylinder 14 includes a first end 22 and a second end 24, and is mounted at its first end 22 to a support bracket 26. The brackets 20 and 26 position the fixed cylinders 12 and 14 to separate the second ends 18 and 24 from each other by a predetermined distance to define a narrow circumferential slit 28.

The system 10 further includes a moving cylinder 30 that is co-axially aligned with the fixed cylinders 12 and 14. The moving cylinder 30 is sized to have an inner surface radius that is slightly larger than the outer surface radii of the fixed cylinders 12 and 14. This allows the moving cylinder 30 to axially slide over the fixed cylinders 12 and 14 while moving between the ends 16 and 22 and across the circumferential slit 28. The moving cylinder 30 is supported for such axial movement by a bracket 32. The bracket 32 provides axial and rotational stiffness, and allows for the positioning of the cylinder 30 to be determined by an air bearing to be described. A translation stage 34 is provided to receive the bracket 32 and guide the axial movement of the moving cylinder 30. The translation stage 34 is mounted to a base 36 that also secures the positioning of the support brackets 20 and 26.

Referring now to FIGS. 1 and 2, mounted to the moving cylinder 30 on either lateral side of the system 10 are spools 38a and 38b for receiving, holding and dispensing a strip of optical media (not shown). Such media preferably comprises optical recording media, but may in the alternative comprise any other sheet or web-like material suitable for use in an optical scanning system. The strip of media is threaded between spools 38a and 38b through openings 42 in the moving cylinder 30, with a segment of the media wrapped around the lower outer surface of the pair of fixed cylinders 12 and 14, and positioned over the slit 28 between the fixed cylinders and the moving cylinder 30. Actuation of motors 40 (only one shown in FIG. 1) mounted to the spools 38a and 38b rotates the spools to receive or dispense segments of the strip of media around the lower outer surface of the fixed cylinders 12 and 14.

A light source (not shown) for the system 10 produces a collimated light beam 44 that passes through an objective focusing lens 46 positioned concentric with the longitudinal axis shared by the co-axially aligned fixed and moving cylinders 12, 14 and 30. The light beam 44 is directed along the optical axis of the lens 46 and deflected by approximately ninety degrees by a rotating scanning mirror 48 to project radially through the slit 28. The axis of rotation for the mirror 48 is aligned with the longitudinal axis of the co-axially aligned fixed and moving cylinders 12, 14 and 30. The lens 46 performs the dual function of focusing the light beam 44 on a segment of the strip of media disposed between the fixed cylinders 12 and 14 and the moving cylinder 30, and also collimating the light reflected back from the media (if needed). The distance between the mirror 48 and lens 46 is fixed in accordance with the known focal length of the lens to focus the deflected light beam 44 on the media when the media is held to the inner surface of the moving cylinder 30 in a manner to be described.

The mirror 48 is rotated (as generally indicated by the arrow 50) by a motor 52 (see, FIG. 1) to continuously sweep the radially through projected and focused light beam 44 along the circumferential slit 28. Although the light beam 44 is swept in a complete circle along the slit 28, the system 10 performs writing or reading operations only when the beam moves from line start 54 to line end 56. Thus, the system 10 scans only that segment of the strip of media held against the inner surface of the moving cylinder 30 and wrapped around the lower outer surface of the fixed cylinders 12 and 14 between line start 54 and line end 56.

Each sweep of the light beam 44 along the slit 28 and across the media scans only a single line across the held segment of the media. Scanning of the entire surface of the held segment of the strip of media threaded between the fixed and moving cylinders 12, 14 and 30 is accomplished by slowly moving the moving cylinder 30 in an axial direction over the fixed cylinders 12 and 14 to trace a plurality of lines across the media. The translation stage 34 includes a pair of tracks 58 for guiding axial movement of the moving cylinder 30.

Reference is now made to FIG. 3, wherein there is shown a schematic diagram illustrating the operational controls for the optical scanning system 10 of the present invention. A control processor 60 is connected to the motor 52 rotating the scanning mirror 48. The control processor 60 is further connected to the motors 40 rotating the spools 38a and 38b to receive or dispense segments of the strip of media. The control processor 60 is also connected to a motor 62 in the translation stage 34 for axially moving (in the directions indicated by arrow 64) the moving cylinder 30 between the ends 16 and 22.

The axial movement of the moving cylinder 30 is facilitated by an air bearing 66 maintained between the moving cylinder and the fixed cylinder 12 and 14. Air output from a pressure source 68 is supplied at 69 to the moving cylinder 30 and expelled from the moving cylinder against the outer surface of the fixed cylinders 12 and 14 to inhibit physical contact between the moving cylinder and the fixed cylinders. The air bearing 66 thus reduces friction between the cylinders 12, 14 and 30, and allows the moving cylinder 30 to move freely over the fixed cylinders 12 and 14 between the ends 16 and 22.

Reference is now made to FIG. 6, wherein there is shown a longitudinal cross-sectional view of the moving cylinder 30. The moving cylinder 30 is generally U-shaped in cross-section. At either end 70 of the moving cylinder 30 is an input 72 connected at 69 to the pressure source 68. An air channel 74 is provided within the moving cylinder 30 to pass air received from the pressure source 68 at the input 72 to a plurality of openings 76. When expelled from the openings 76, the air impacts against the outer surface of the fixed cylinders 12 and 14 to support the moving cylinder 30 and form the air bearing 66.

Referring again to FIG. 3, air output from the pressure source 68 is also supplied at 78 to the fixed cylinders 12 and 14. This air is expelled from the fixed cylinders into the area 80 between the cylinders defined by the U-shaped cross-section of the moving cylinder 30. It is through this area 80 that the segment of the strip of media is threaded and wrapped around the lower outer surface of the fixed cylinders 12 and 14.

Referring now to FIG. 5, there is shown a partial longitudinal cross-sectional view of the fixed cylinders 12 and 14. At ends 16 and 22 of the fixed cylinders 12 and 14, respectively, there is an input 82 (not shown for cylinder 14) connected at 78 to the pressure source 68. An air channel 84 is provided within the fixed cylinders 12 and 14 to pass air received from the pressure source 68 at the input 82 to a plurality of openings 86. When expelled from the openings 86, the air impacts against the surface of the portion of the media positioned in the area 80 lifting the media from contact with the outer surface 88 of the fixed cylinders 12 and 14.

Referring again to FIGS. 3 and 6, air output from the pressure source 68 is also supplied at 90 to a valve 92 that is connected to the moving cylinder 30 at 98 to supply the air to the area 80. The valve 92 is also connected at 94 to a vacuum source 96 for drawing air from area 80 and holding the segment of media against the inner surface of the moving cylinder 30. The valve 92 is operated by the control processor 60 to selectively connect the pressure source 68 and the vacuum source 96 to the moving cylinder 30 in a manner to be described.

An input 100 on the moving cylinder 30 is connected at 98 to the valve 92. An air channel 102 is provided within the moving cylinder 30 to allow air to flow between the valve 92 and a plurality of openings 104. When the valve 92 connects input 100 to the pressure source 68, air is expelled from the openings 104 to impact against the surface of the portion of the media positioned in the area 80 lifting the segment of the media from contact with the inner surface 106 of the moving cylinder 30. When the valve 92 connects input 100 to the vacuum source 96, air is drawn through the openings 104 to hold the segment of the media positioned in the area 80 against the inner surface 106 of the moving cylinder 30.

A more complete understanding of the operation of the optical scanning system 10 of the present invention may be had by reference to FIGS. 4A–4E which show a series of partial longitudinal cross-sectional views of the system 10 optically scanning a segment of the strip of media 108 positioned between the fixed cylinders 12 and 14, and moving cylinder 30.

In FIG. 4A, the moving cylinder 30 is shown positioned toward the end 16. The segment of the strip of media 108 is shown positioned in the area 80 between the cylinders 12, 14 and the cylinder 30. While in this position, control processor 60 operates valve 92 to connect the pressure source 68 to input 100 on the moving cylinder 30 supplying air into the area 80. The pressure source 68 also supplies air to inputs 72 on the moving cylinder 30 and inputs 82 on the fixed cylinders 12 and 14. With air being expelled from openings 86 and 104, the segment of the strip of media 108 floats in the area 80 without contacting either the outer surface of the fixed cylinders 12 and 14, or the inner surface of the moving cylinder 30. This allows the control processor 60 to actuate the motors 40 on the spools 38a and 38b to advance a next segment of the media 108 into position without danger of the media being damaged (for example, scratched) due to contact with the cylinder surfaces.

Figure 4B:
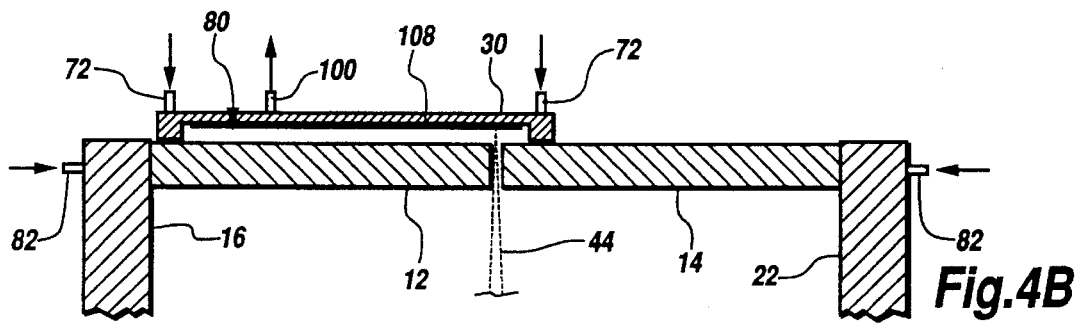

In FIG. 4B, the moving cylinder 30 is still shown positioned toward the end 16. Advancement to position a next segment of media 108 around the outer surface 88 of the fixed cylinders 12 and 14 for scanning has been completed. The control processor 60 switches valve 92 to connect the vacuum source 96 to input 100 on the moving cylinder 30. The pressure source 68 continues to supply air to inputs 72 on the moving cylinder 30 and inputs 82 on the fixed cylinders 12 and 14. With air being drawn by the vacuum source 96 from the openings 104, the media 108 is held against the inner surface 106 of the moving cylinder 30, and scanning of the segment of media with the light beam 44 begins.

Figure 4C:
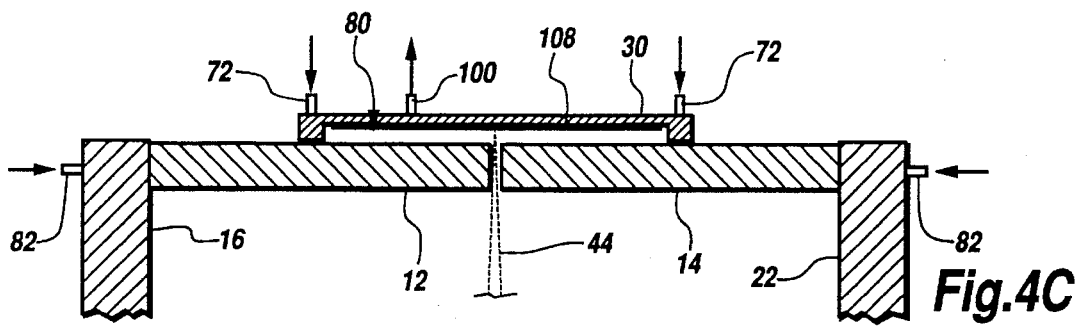
Figure 4D:
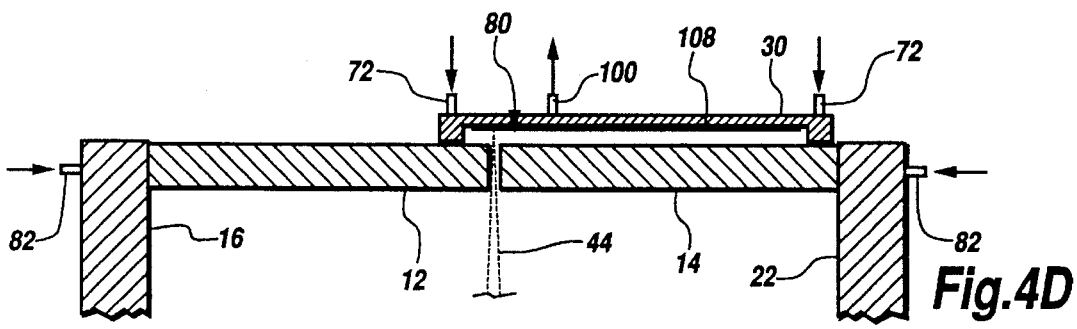

In FIG. 4C, the control processor 60 actuates motor 62 in the translation stage 34 to move the moving cylinder 30 from end 16 toward end 22 as the media is scanned by the light beam 44. In FIG. 4D, movement of the moving cylinder 30 ceases as the cylinder is positioned toward end 22 with the light beam 44 scanning the last line on the held portion of the strip of media 108. In the operations illustrated in FIGS. 4C and 4D, the vacuum source 96 continues to be connected to input 100 on the moving cylinder 30 to hold the media 108, and the pressure source 68 continues to be connected to inputs 72 on the moving cylinder and inputs 82 on the fixed cylinders 12 and 14 to form the air bearing.

Figure 4E:
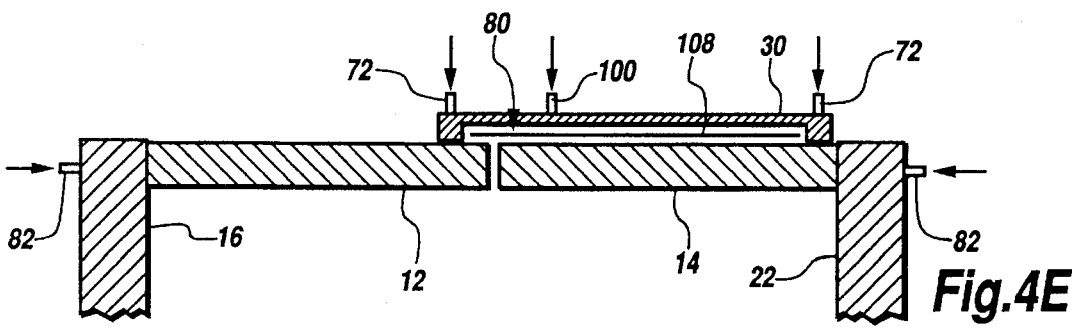

In FIG. 4E, the moving cylinder 30 is shown positioned toward the end 22. While in this position, control processor 60 operates valve 92 to connect input 100 to the pressure source 65 and supply air to the moving cylinder 30. The pressure source 68 also supplies air to inputs 72 on the moving cylinder 30 and to inputs 82 of the fixed cylinders 12 and 14. With air being expelled from openings 86 and 104, the segment of media 108 floats in the area 80 to allow for advancement of the media without contacting the cylinders. At or about the same time as the strip of media 108 is advanced by actuation of motors 40 to bring a next segment of the strip of media into position for scanning, the control processor 60 actuates the motor 62 to return the moving cylinder 30 into position toward the end 16 as shown in FIG. 4A. The scanning process then repeats for the next segment of the media.

Although the preferred embodiment of the system 10 the present invention scans media comprising optical data recording media, it will of course be understood that the system may also be used in connection with other type of sheet or web-like materials in optical scanning applications such as printing. The present invention is not limited to the embodiment shown in the Drawings and described in the foregoing Detailed Description, but rather is capable of numerous rearrangements, substitutions and modifications without departing from the spirit of the invention.

We claim:

1. A system for optically scanning recording media, comprising:

a fixed cylinder having an outer surface and having a circumferential slit and a longitudinal axis;

a moving cylinder coaxially positioned around the fixed cylinder and having an inner surface;

means for selectively positioning a segment of the recording media against the inner surface of the moving cylinder during media scanning and between the inner surface of the moving cylinder and the outer surface of the fixed cylinder during media advancement;

scanning means for radially projecting a light beam through the circumferential slit and focusing the beam on the segment of media positioned against the inner surface of the moving cylinder;

first drive means for rotating the scanning means to scan the radially projected light beam through and along the circumferential slit; and second drive means for translating the moving cylinder with reference to the fixed cylinder parallel to the longitudinal axis and across the circumferential slit to scan the light beam across the surface of the positioned segment of the recording media; and means for forming an air bearing to inhibit physical contact between the moving cylinder and the fixed cylinder.

2. The system as in claim 1 wherein the means for forming an air bearing comprises:

a pressure source for supplying pressurized air;

means for connecting the pressure source to the moving cylinder; and means within the moving cylinder for expelling the air supplied by the pressure source against an outer surface of the fixed cylinder.

3. The system as in claim 1 wherein the scanning means comprises a reflective mirror, and the first drive means rotates the reflective mirror about an axis aligned with the longitudinal axis to scan the reflected light beam along the circumferential slit.

4. The system as in claim 1 wherein the means for selectively positioning the segment of recording media comprises:

a vacuum source;

means for connecting the vacuum source to the moving cylinder; and means within the moving cylinder for drawing a vacuum adjacent the inner surface of the moving cylinder to position the segment of recording media against the inner surface.

5. The system as in claim 4 wherein the means for selectively positioning the segment of recording media further comprises:

a pressure source for supplying pressurized air;

means for connecting the pressure source to the moving cylinder and the fixed cylinder;

means within the moving cylinder for expelling air against the media; and means within the fixed cylinder for expelling air against the media to float the segment of recording media between the fixed cylinder and the moving cylinder.

6. The system as in claim 5 further including means for advancing the recording media to position a next segment of the recording media between the fixed cylinder and the moving cylinder as the media floats between the cylinders.

7. A system for optically scanning recording media, comprising:

a fixed cylinder having an outer surface and having a circumferential slit and a longitudinal axis;

a moving cylinder coaxially positioned around the fixed cylinder and having an inner surface;

means for selectively positioning a segment of the recording media between the inner surface of the moving cylinder and the outer surface of the fixed cylinder said means for selectively positioning comprising, a pressure source for supplying pressurized air to the moving cylinder and the fixed cylinder, a vacuum source for drawing a vacuum in the moving cylinder, means for selecting between the pressure source and the vacuum source for connection to the moving cylinder, and means for actuating the means for selecting to connect the pressure source to the moving cylinder and the fixed cylinder to float the recording media between the fixed cylinder and the moving cylinder during media advancement and connect the vacuum source to the moving cylinder to position the recording media against the inner surface of the moving cylinder during media scanning;

scanning means for radially projecting a light beam through the circumferential slit and focusing the beam on the segment of media positioned against the inner surface of the moving cylinder;

first drive means for rotating the scanning means to scan the radially protected light beam through and along the circumferential slit; and second drive means for translating the moving cylinder with reference to the fixed cylinder parallel to the longitudinal axis and across the circumferential slit to scan the light beam across the surface of the positioned segment of the recording media.

8. The system as in claim 7 further including:

means for spooling the recording media, the recording media threaded between the moving cylinder and the fixed cylinder; and drive means for actuating the means for spooling to advance the recording media to position a next segment between the fixed cylinder and the moving cylinder.

9. The system as in claim 7 further comprising means for forming an air bearing to inhibit physical contact between the moving cylinder and the fixed cylinder.

10. A method for optically scanning recording media, comprising the steps of:

(a) threading the recording media between an outer surface of a fixed cylinder having a circumferential slit and an inner surface of a coaxial moving cylinder;

(b) advancing the recording media to position a segment of the recording media between the fixed cylinder and the moving cylinder;

(c) applying a vacuum to the inner surface of the moving cylinder to position the segment of the recording media against the inner surface;

(d) projecting a light beam through and repeatedly scanning the light beam along the circumferential slit;

(e) axially translating the moving cylinder with reference to the fixed cylinder to scan the light beam across the surface of the positioned segment of the recording media;

(f) releasing the vacuum to release the positioned segment of the recording media from the inner surface of the moving cylinder;

(g) repeating steps (b) through (f) to scan a next segment of the recording media; and (h) providing an air bearing during step (e) for inhibiting physical contact between the inner surface of the moving cylinder and the outer surface of the fixed cylinder during translation of the moving cylinder.

11. The method as in claim 10 wherein the step of providing an air bearing comprises the step of expelling air from the inner surface of the moving cylinder against the outer surface of the fixed cylinder.

12. The method as in claim 10 wherein the step of advancing the recording media further includes the steps of:

expelling air from the inner surface of the moving cylinder against the segment of recording media to separate the media from the inner surface; and expelling air from the outer surface of the fixed cylinder against the segment of recording media to separate the media from the outer surface.

* * * * *